United States Patent
Gu et al.

(10) Patent No.: US 11,375,357 B1
(45) Date of Patent: Jun. 28, 2022

(54) HIGH THROUGHPUT SHORT-RANGE WIRELESS GATEWAY

(71) Applicant: InPlay, Inc., Irvine, CA (US)

(72) Inventors: Yongru Gu, Ladera Ranch, CA (US); Qun Wu, Irvine, CA (US)

(73) Assignee: INPLAY, INC., Irvine, CA (US)

( * ) Notice: Subject to any disclaimer, the term of this patent is extended or adjusted under 35 U.S.C. 154(b) by 0 days.

(21) Appl. No.: 17/649,174

(22) Filed: Jan. 27, 2022

(51) Int. Cl.
| | |
|---|---|
| *H04W 4/00* | (2018.01) |
| *H04W 8/00* | (2009.01) |
| *H04W 76/15* | (2018.01) |
| *G06F 13/10* | (2006.01) |
| *H04W 88/16* | (2009.01) |
| *H04W 84/18* | (2009.01) |

(52) U.S. Cl.
CPC ............ *H04W 8/005* (2013.01); *G06F 13/10* (2013.01); *H04W 76/15* (2018.02); *H04W 84/18* (2013.01); *H04W 88/16* (2013.01)

(58) Field of Classification Search
CPC ..... H04W 8/005; H04W 76/15; H04W 84/18; H04W 88/16; G06F 13/10
USPC .............................................. 710/9; 370/329
See application file for complete search history.

(56) References Cited

U.S. PATENT DOCUMENTS

| | | | | |
|---|---|---|---|---|
| 11,165,866 | B2* | 11/2021 | Kandan ................. | H04W 12/50 |
| 11,246,026 | B2* | 2/2022 | Kandan ................. | H04W 12/03 |
| 2012/0314623 | A1* | 12/2012 | Pesonen ............... | H04W 40/32 370/254 |
| 2016/0174022 | A1* | 6/2016 | Nhu ....................... | H04W 4/70 455/41.2 |
| 2016/0182803 | A1* | 6/2016 | Song .................. | H04N 1/00209 348/211.2 |
| 2017/0353979 | A1* | 12/2017 | Lee ........................ | H04W 12/03 |
| 2018/0099643 | A1* | 4/2018 | Golsch .................... | H04W 4/30 |
| 2018/0213349 | A1* | 7/2018 | Panje ................. | H04L 65/1023 |
| 2019/0098494 | A1* | 3/2019 | Pry ....................... | H04W 12/033 |
| 2019/0215369 | A1* | 7/2019 | Pry ........................ | H04W 12/02 |
| 2019/0364407 | A1* | 11/2019 | Kaseva ................. | H04W 4/80 |
| 2022/0038539 | A1* | 2/2022 | Kandan .................. | H04W 4/38 |

* cited by examiner

*Primary Examiner* — Marceau Milord
(74) *Attorney, Agent, or Firm* — Innovation Capital Law Group, LLP; Vic Lin

(57) ABSTRACT

A short-range wireless communication gateway, such as a Bluetooth® low energy (BLE) gateway, has improved aggregated throughput by incorporating multiple central devices within a single gateway, where each central device is configured to operate with a subset of the peripheral devices. Algorithms are provided to determine to which central device a newly discovered peripheral device will connect. To help avoid data collisions, the wireless band dedicated to the short-range wireless communication can be divided into a plurality of sub-bands, where the number of sub-bands typically corresponds with the number of central devices within the gateway.

20 Claims, 4 Drawing Sheets ized as an example and are not limited by the figures of the
HIGH THROUGHPUT SHORT-RANGE WIRELESS GATEWAY

BACKGROUND OF THE INVENTION

1. Field of the Invention

Embodiments of the invention relate generally to wireless communication. More particularly, embodiments of the invention relate to a high throughput short-range wireless gateway, such as a high throughput Bluetooth® gateway.

2. Description of Prior Art and Related Information

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Typically, a Bluetooth Low Energy (BLE) gateway 100 contains a BLE central device 102 which is constantly scanning BLE beacon devices 104 (also shown as BD1 through BD-N) or BLE advertisers and reports the collected beacon/advertising data to a cloud server 106 through Wi-Fi, Ethernet or mobile networks via a network module 110. This is illustrated in FIG. 1 where there are N BLE beacon devices 104 (or advertising devices). The BLE central device 102 is constantly listening to the beacon devices 104 and reporting the beacon data 108 to the cloud server 106.

Nowadays, for more sophisticated applications, the BLE central device 102 also needs to make connections to multiple BLE peripheral devices 112, as shown in FIG. 2. Typically, the BLE beacon devices 104, when they are initially setup, they are often required to connect to the central device 102 in the gateway 100 to exchange configuration data.

The up limit of BLE throughput is 2 Mbps. The achievable aggregated throughput will be typically much smaller than 2 Mbps in a typical case where a BLE central device is connecting to multiple BLE peripheral devices.

In view of the foregoing, there is a need for a high throughput BLE gateway that can offer increased aggregated throughput for both BLE beacon devices and BLE peripheral devices.

SUMMARY OF THE INVENTION

Embodiments of the present invention provide a wireless communication gateway comprising a plurality of central devices, each operable to provide a wireless connection with one or more peripheral devices; a network module operable to provide data communication between the wireless communication gateway and a cloud server; and a processor operable to execute one or more algorithms to assign a newly discovered peripheral device to a selected one of the plurality off central devices.

In some embodiments, the wireless communication gateway and peripheral devices are a Bluetooth® low energy (BLE) devices.

Embodiments of the present invention further provide a short-range wireless communication gateway comprising a plurality of central devices, each operable to provide a wireless connection with one or more peripheral devices; a network module operable to provide data communication between the wireless communication gateway and a cloud server; and a processor operable to execute one or more algorithms to assign a newly discovered peripheral device to a selected one of the plurality off central devices, wherein the one or more algorithms includes at least a first algorithm and a second algorithm; the first algorithm assigns the newly discovered peripheral device to the selected one of the plurality of central devices based on which central device has a fewest number of connections to the one or more peripheral devices; and the second algorithm assigns the newly discovered peripheral device to the selected one of the plurality of central devices based on which of the plurality of central devices has the least used aggregate throughput.

Embodiments of the present invention also provide a short-range wireless communication gateway comprising a plurality of central devices, each operable to provide a wireless connection with one or more peripheral devices; a network module operable to provide data communication between the wireless communication gateway and a cloud server; and a processor operable to execute one or more algorithms to assign a newly discovered peripheral device to a selected one of the plurality off central devices, wherein the wireless connection is provided on a frequency range that is divided into a plurality of sub-bands, wherein each connection between one of the plurality of central devices and one of the one or more peripheral devices is assigned to one of the plurality of sub-bands; and a number of the plurality of sub-bands is equal to a number of the plurality of central devices, where each of the plurality of central devices is assigned to a distinct one of the plurality of sub-bands.

These and other features, aspects and advantages of the present invention will become better understood with reference to the following drawings, description and claims.

BRIEF DESCRIPTION OF THE DRAWINGS

Some embodiments of the present invention are illustrated as an example and are not limited by the figures of the accompanying drawings, in which like references may indicate similar elements.

Figure 1:
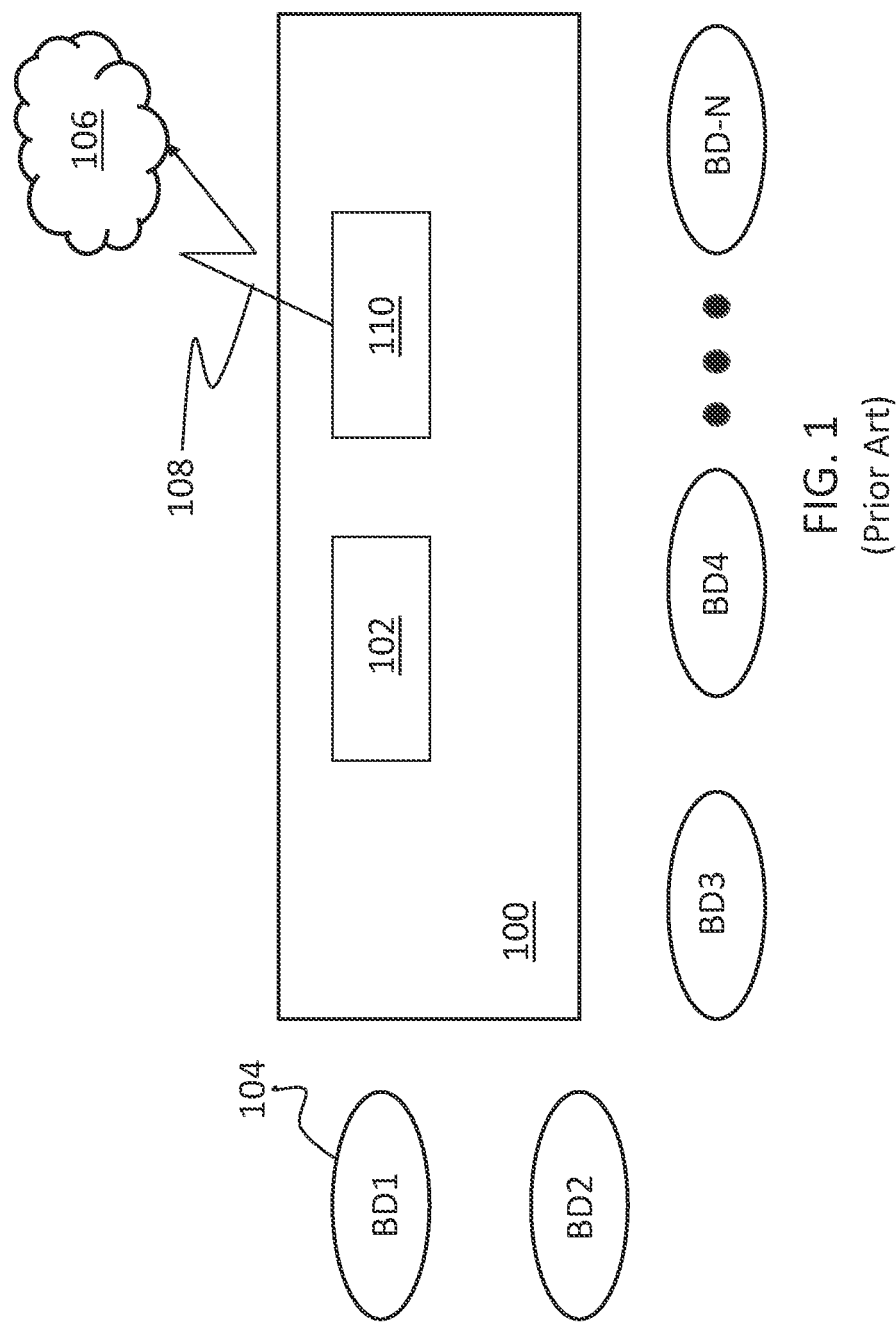
FIG. 1 illustrates a conventional short-range wireless gateway and beacon devices.
Figure 2:
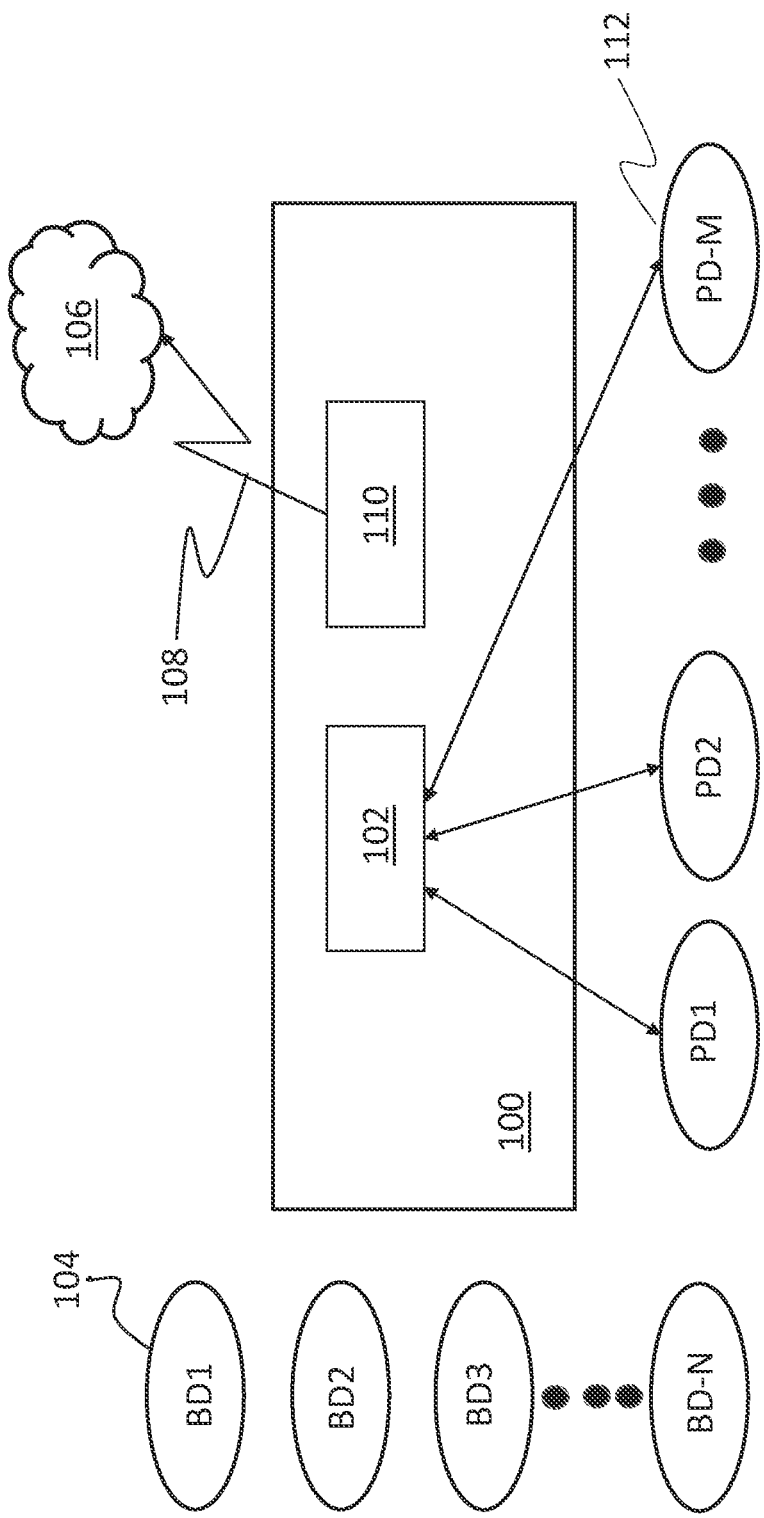
FIG. 2 illustrates a conventional short-range wireless gateway with beacon devices and peripheral devices.

Unless otherwise indicated illustrations in the figures are not necessarily drawn to scale.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS AND BEST MODE OF INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

As is well known to those skilled in the art, many careful considerations and compromises typically must be made when designing for the optimal configuration of a commercial implementation of any system, and in particular, the embodiments of the present invention. A commercial implementation in accordance with the spirit and teachings of the present invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Broadly, embodiments of the present invention provide a short-range wireless communication gateway, such as a Bluetooth® low energy (BLE) gateway, that has improved aggregated throughput by incorporating multiple central devices within a single gateway, where each central device is configured to operate with a subset of the peripheral devices. Algorithms are provided to determine to which central device a newly discovered peripheral device will connect. To help avoid data collisions, the wireless band dedicated to the short-range wireless communication can be divided into a plurality of sub-bands, where the number of sub-bands typically corresponds with the number of central devices within the gateway.

As used herein, the term "short-range" describes a wireless network that has a range limited to, for example, about 100 meters. Typical class 2 Bluetooth® may have a range of about 10 meters, for example. Some short-range wireless communications may provide a range up to about 400 meters. Typically, a short-range wireless network refers to a Bluetooth® network, although other similar networks may be contemplated within the scope of the present invention. One example of a short-range wireless network is a Bluetooth® low energy (BLE) network. While the description below refers to BLE networks and related BLE devices, it should be understood that the present invention is not meant to be limited to strictly such devices.

Figure 3:
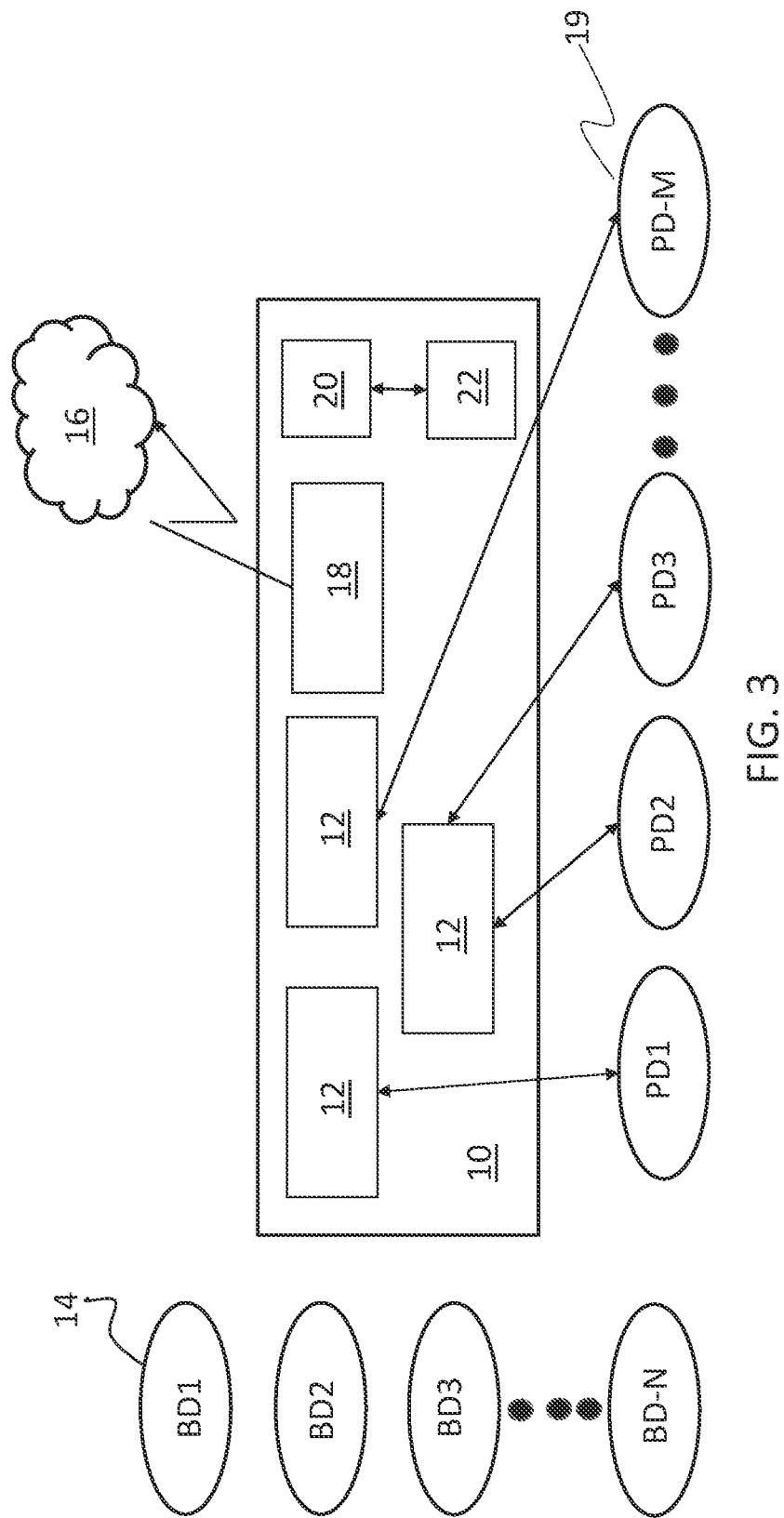
FIG. 3 illustrates a short-range wireless gateway having multiple central devices therein, according to an exemplary embodiment of the present invention.

Referring now to FIG. 3, to increase the aggregated throughput of a gateway 10, such as a BLE gateway, multiple central devices 12, such as BLE central devices, can be disposed inside the gateway 10. Each of the central devices 12 may be configured to operate with a subset of peripheral devices 19, such as BLE peripheral devices. As discussed above, a plurality of beacon devices 14 may also communicate with the gateway 10, as is known in the art. A network module 18 may communicate, via various communication protocols, such as Wi-Fi, ethernet, mobile networks, or the like, to the cloud server 16.

When there is a need to connect a central device 12 to a new peripheral device 19, embodiments of the present invention provide algorithms to make such a pairing between a selected one of the central devices 12 and the new one of the peripheral devices 19.

A first algorithm is based on the existing number of connections for each central device 12. The algorithm can be designed to pick the central device 12 with the least existing number of connections to connect the new peripheral device. If all the central devices have the same number of existing connections, the algorithm can randomly select one.

A second algorithm is based on the used aggregated throughput for a central device. The algorithm can pick the central device with the least used aggregated throughput to connect the new peripheral device. If all the central devices have the same used throughputs, the algorithm can randomly select one. The used aggregated throughput can be measured for each of the central devices. Such throughput can be measured, for example, over a given period of time, such as the throughput averaged over the past second, minute, hour, the past day, or the like. The used aggregated throughput data may be stored in a memory 22 that is operably connected to a processor 20. In some embodiments, the used aggregated throughput may be determined in real time, at the time the new peripheral devices is detected and is looking to connect to a central device.

The processor 20 can store program code to execute the algorithms described herein. The program code may be stored in the memory 22, or may be accessed via the network module 18, for example.

In some embodiments, the system can use one of the two algorithms described above to assign a new peripheral device to a central device. In other embodiments, both algorithms can be used to determine which central device to connect the new peripheral device. For example, the first algorithm may be afforded a weight of 0.25, while the second algorithm may be afforded a weight of 0.75. Thus, while one central device may have fewer connections, a new peripheral device may be connected to a different central device (with a greater number of connections), if such central device has a significantly lower used aggregated throughput.

Figure 4:
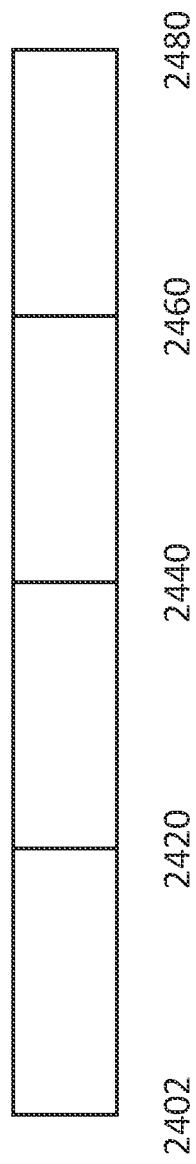
FIG. 4 illustrates an exemplary division of the 2.4 GHz industrial, scientific and medical (ISM) band into several sub-bands, according to an exemplary embodiment of the present invention.

When a pair of devices (a central device 12 and a peripheral device 19) communicates to each other, they can have collision with another pair of devices over the air. Hence, embodiments of the present invention can permit each central device to use a sub-band of the 2.4 GHz ISM band. The whole 2.4 GHz ISM band can be divided into several sub-bands as illustrated in FIG. 4, where the ISM band is divided into 4 sub-bands, for example, where sub-band 1 is from 2402 MHz to 2420 MHz, sub-band 2 is from 2420 MHz to 2440 MHz, sub-band 3 is from 2440 MHz to 2460 MHz and sub-band 4 is from 2460 MHz to 2480 MHz.

In some embodiments, the number of sub-bands can be the same as the number of central devices. During scanning, the central devices can always use BLE channel 37 (corresponding channel 2402 MHz), BLE channel 38 (2426 MHz) and BLE channel 39 (2480 MHz). After a connection is established, the central device can use the sub-band to which it is assigned.

While the above refers to using a 2.4 GHz ISM band, which is currently used for short-range wireless protocols, such as Bluetooth®, other frequency bands may be used within the scope of the present invention. For example, currently, the frequency range for Bluetooth® is from 2402 MHz to 2480 MHz. In the near future, the Bluetooth® standard may add another band (such as a 5.8 GHz band, from 5725 MHz to 5875 MHz) for Bluetooth® to use. In that case, the whole frequency range available for use in the present invention can become 2402 MHz to 2480 MHz plus 5725 MHz 5875 MHz. For this new whole frequency range, aspects of the present invention can apply the same idea of sub-bands and allocation of different sub-band to a different central device.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Claim elements and steps herein may have been numbered and/or lettered solely as an aid in readability and understanding. Any such numbering and lettering in itself is not intended to and should not be taken to indicate the ordering of elements and/or steps in the claims.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. A wireless communication gateway comprising:
   a plurality of central devices, each operable to provide a wireless connection with one or more peripheral devices;
   a network module operable to provide data communication between the wireless communication gateway and a cloud server; and
   a processor operable to execute one or more algorithms to assign a newly discovered peripheral device to a selected one of the plurality off central devices, wherein
   the one or more algorithms includes a first algorithm that assigns the newly discovered peripheral device to the selected one of the plurality of central devices based on which central device has a fewest number of connections to the one or more peripheral devices; and
   if each of the plurality of central devices has the same number of connections to the one or more peripheral devices, then the first algorithm assigns the newly discovered peripheral device to a randomly selected one of the plurality of central devices.

2. The wireless communication gateway of claim 1, further comprising memory for storing the one or more algorithms.

3. The wireless communication gateway of claim 1, wherein the one or more algorithms includes a second algorithm that assigns the newly discovered peripheral device to the selected one of the plurality of central devices based on which of the plurality of central devices has the least used aggregate throughput.

4. The wireless communication gateway of claim 3, wherein, if each of the plurality of central devices has the same used aggregate throughput, then the second algorithm assigns the newly discovered peripheral device to a randomly selected one of the plurality of central devices.

5. The wireless communication gateway of claim 1, wherein the newly discovered peripheral device is assigned to one of the plurality of central devices based on a weighted combination of the first algorithm and the second algorithm.

6. The wireless communication gateway of claim 1, wherein the wireless connection is a short-range wireless connection.

7. The wireless communication gateway of claim 1, wherein the wireless connection is a Bluetooth® Low Energy (BLE) wireless connection.

8. The wireless communication gateway of claim 1, wherein the wireless connection is provided on a frequency range that is divided into a plurality of sub-bands, wherein each connection between one of the plurality of central devices and one of the one or more peripheral devices is assigned to one of the plurality of sub-bands.

9. The wireless communication gateway of claim 8, wherein the frequency range is within a 2.4 GHz industrial, scientific and medical band.

10. The wireless communication gateway of claim 8, wherein a number of the plurality of sub-bands is equal to a number of the plurality of central devices, where each of the plurality of central devices is assigned to a distinct one of the plurality of sub-bands.

11. A short-range wireless communication gateway comprising:
    a plurality of central devices, each operable to provide a wireless connection with one or more peripheral devices;
    a network module operable to provide data communication between the wireless communication gateway and a cloud server; and
    a processor operable to execute one or more algorithms to assign a newly discovered peripheral device to a selected one of the plurality off central devices, wherein
    the wireless connection is provided on a frequency range that is divided into a plurality of sub-bands, wherein each connection between one of the plurality of central devices and one of the one or more peripheral devices is assigned to one of the plurality of sub-bands; and
    a number of the plurality of sub-bands is equal to a number of the plurality of central devices, where each of the plurality of central devices is assigned to a distinct one of the plurality of sub-bands.

12. The wireless communication gateway of claim 11, wherein the frequency range is within a 2.4 GHz industrial, scientific and medical band.

13. The wireless communication gateway of claim 11, wherein:
    the one or more algorithms includes a first algorithm and a second algorithm;
    the first algorithm assigns the newly discovered peripheral device to the selected one of the plurality of central devices based on which central device has a fewest number of connections to the one or more peripheral devices; and
    the second algorithm assigns the newly discovered peripheral device to the selected one of the plurality of central devices based on which of the plurality of central devices has the least used aggregate throughput.

14. The wireless communication gateway of claim 13, wherein:
    the one or more algorithms includes a first algorithm and a second algorithm;
    the first algorithm assigns the newly discovered peripheral device to the selected one of the plurality of central devices based on which central device has a fewest number of connections to the one or more peripheral devices; and
    the second algorithm assigns the newly discovered peripheral device to the selected one of the plurality of central devices based on which of the plurality of central devices has the least used aggregate throughput.

15. The wireless communication gateway of claim 14, wherein the newly discovered peripheral device is assigned to one of the plurality of central devices based on a weighted combination of the first algorithm and the second algorithm.

16. A wireless communication gateway comprising:
    a plurality of central devices, each operable to provide a wireless connection with one or more peripheral devices;
    a network module operable to provide data communication between the wireless communication gateway and a cloud server; and
    a processor operable to execute one or more algorithms to assign a newly discovered peripheral device to a selected one of the plurality off central devices, wherein
    the wireless connection is provided on a frequency range that is divided into a plurality of sub-bands, wherein each connection between one of the plurality of central devices and one of the one or more peripheral devices is assigned to one of the plurality of sub-bands.

17. The wireless communication gateway of claim 16, wherein the frequency range is within a 2.4 GHz industrial, scientific and medical band.

18. The wireless communication gateway of claim 16, wherein a number of the plurality of sub-bands is equal to a number of the plurality of central devices, where each of the plurality of central devices is assigned to a distinct one of the plurality of sub-bands.

19. The wireless communication gateway of claim 16, wherein the wireless connection is a short-range wireless connection.

20. The wireless communication gateway of claim 19, wherein the wireless connection is a Bluetooth® Low Energy (BLE) wireless connection.

* * * * *